2 Sheets—Sheet 2.
G. W. PARKER.
MACHINE FOR MAKING PAIL-BOTTOMS AND BARREL-HEADS.
No. 192,385. Patented June 26, 1877.
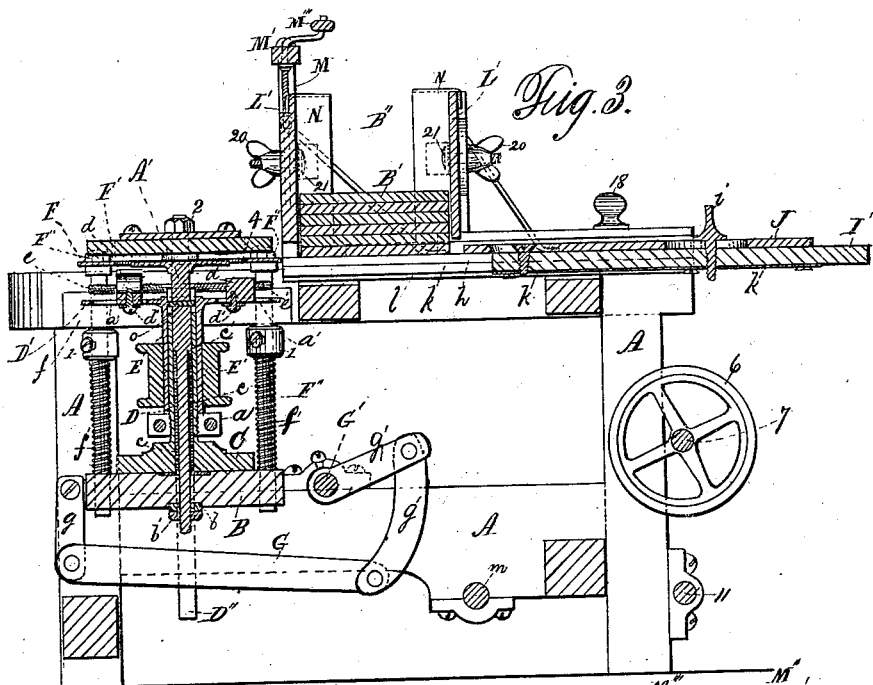
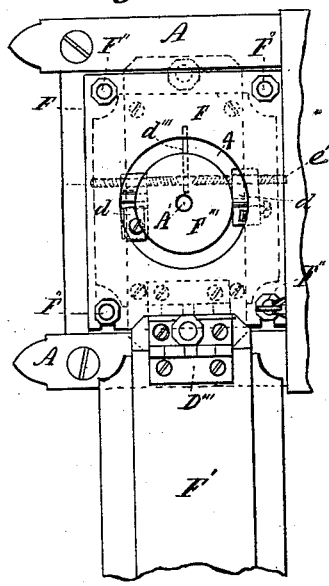
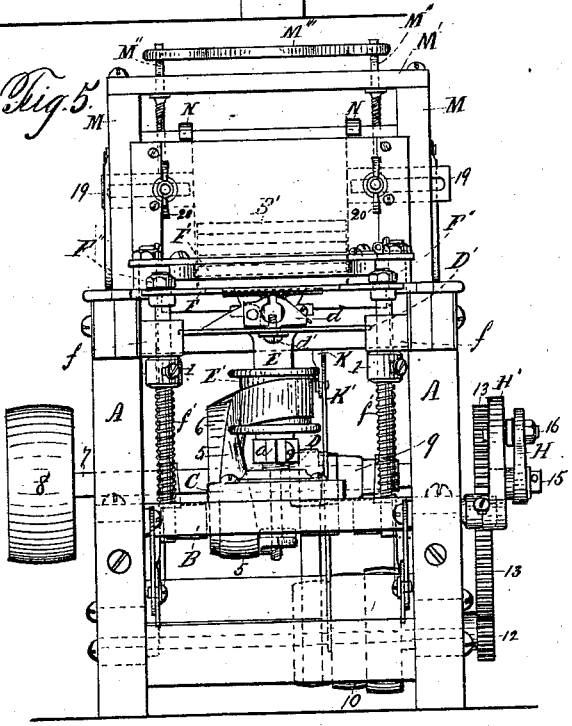
WITNESSES;
Daniel D. Parker
George R. Chaffee
INVENTOR;
George W. Parker

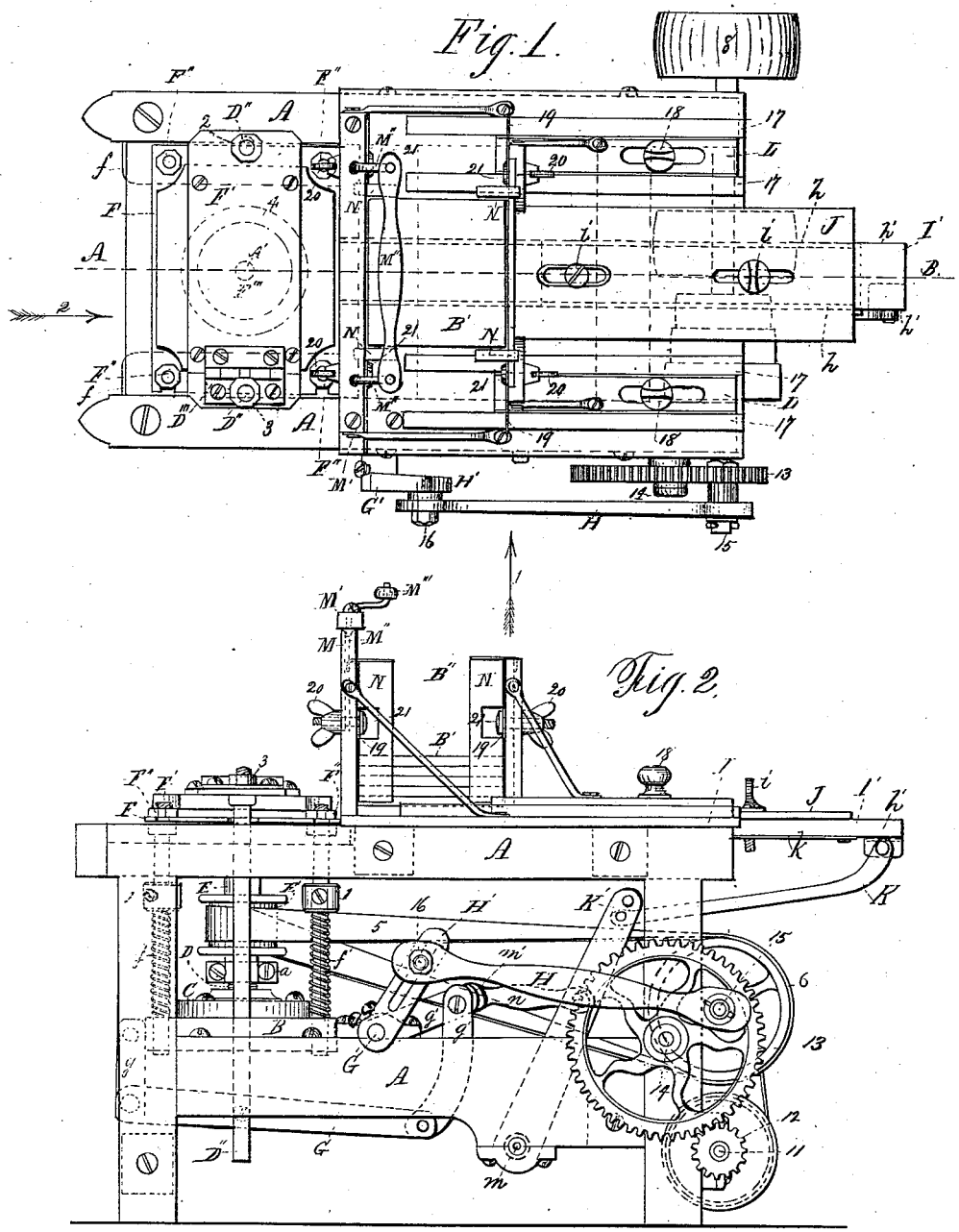
G. W. PARKER.
MACHINE FOR MAKING PAIL-BOTTOMS AND BARREL-HEADS.
No. 192,385. Patented June 26, 1877.

UNITED STATES PATENT OFFICE.

GEORGE W. PARKER, OF GARDNER, MASSACHUSETTS.

IMPROVEMENT IN MACHINES FOR MAKING PAIL-BOTTOMS AND BARREL-HEADS.

Specification forming part of Letters Patent No. 192,385, dated June 26, 1877; application filed April 28, 1876.

*To all whom it may concern:*

Be it known that I, GEORGE W. PARKER, of Gardner, in the county of Worcester and Commonwealth of Massachusetts, have invented certain new and useful Improvements in Machines for making Pail-Bottoms; and I do hereby declare that the following is a full, clear, and exact description of the same, reference being had to the accompanying drawings, forming a part of this specification, and in which—

Figure 1 represents a top or plan view of my said improved machine. Fig. 2 represents a side view, looking in the direction of arrow 1, Fig. 1. Fig. 3 represents a vertical longitudinal central section on line A B, Fig. 1. Fig. 4 represents a top or plan view of the left-hand end of the machine, shown in Fig. 1, with the top head-holding plate turned back, as will be hereinafter explained; and Fig. 5 represents an end view, looking in the direction of arrow 2, Fig. 1.

To enable those skilled in the art to which my invention belongs, to make and use the same, I will proceed to describe it more in detail.

In the drawings, the parts marked A represent the main frame of the machine, which is of rectangular form. At the left-hand end of the machine is arranged a cross bed-plate, B, upon which is mounted a supporting stand-plate, C, from which rises a tubular stand, D, upon the lower part of which is secured a set-nut, $a$, and above said set-nut is arranged a tubular shaft, E, upon which is secured a pulley, E'. Upon the upper end of tubular shaft E is arranged a plate, D', having two slots, $a'$ $a'$, cut in it, in line with each other, but upon opposite sides of the spindle A', which passes through the center of the tubular stand D, and is provided at its lower end with nuts $b$ $b'$—$b'$ serving as a locking-nut to prevent the spindle A' from being forced up too high by the spiral spring $c$, which is arranged upon said spindle between cross-piece B and the shoulder $c'$ on spindle A', all as fully indicated in Fig. 3. Cutter-heads $d$ $d$, having tongues which pass through slots $a'$ $a'$, are arranged upon the rotating plate D', and are held in place when adjusted, as hereinafter described, by means of screws $d'$ $d'$, washers being placed upon said screws between their heads and the rotating plate D'. The cutter-heads $d$ $d$ are connected by means of an adjusting screw-rod $e$, said rod having screw-threads cut upon its outer ends, in opposite directions, so that when it is turned in one direction, by a wrench applied to its head, $e'$, the cutter-heads $d$ $d$ will be moved toward each other simultaneously, and vice versa, whereby said cutters can be arranged to cut heads for pails, barrels, and other similar articles, of different sizes, as occasion may require.

The respective cutters may be held in their heads $d$ by means of a set-screw, or in any other suitable manner, one cutter being arranged to cut through the material to leave it in circular form, while the other cutter is arranged to bevel off the edge of the head, and a greater or less bevel may be given, as desired, by simply arranging the cutter more or less inclined.

Screw-rod $e$ is retained from moving longitudinally by means of a stay-plate, $d'''$, rigidly secured to the rotating plate D', to which the cutter-heads are secured, there being a notch or groove formed in the center of screw-rod $e$, into which a portion of stay-plate $d'''$ enters. In Fig. 3 the spline-pin $o$, which keeps spindle A' from turning, is shown in section.

The material from which the heads are cut is first cut up into rectangular pieces, B', and placed in a hopper, B'', from which it is fed forward at the proper time between plates F and F', the former being secured at its corners to four upright rods, F'', which rods extend down loosely through guide-pieces $f$, attached to the inner sides of the main frame, and thence down through holes in the cross bed-piece B, spiral springs $f'$ $f'$ being arranged upon said rods, so that said springs press at their lower ends upon bed-piece B, and at their upper ends against adjustable hubs 1, secured upon the respective rods F''.

Springs $f'$ $f'$, by their action, keep plate F elevated above the cutters, excepting when said plate is forced down by the depression of plate F', and which depression takes place after every blank head-piece B' has been fed forward under said plate F', the latter plate being raised and depressed by a positive motion through the action of vertical rods D'', the upper ends of which are connected to said plate, while their lower ends are connected to lever G, one end of which is connected by means of a link, g, to the main frame A, while the other end is connected by a link, g', to the crank-arm g'', fastened to the rocking shaft G', so that as shaft G' rocks back and forth it raises and depresses rods D'' together with the pressing-plate F', and which pressing-plate F' is provided with a hinge, D''', at one end, whereby, when nut 2 is removed and nut 3 loosened, pressing-plate F' can be raised at its free end, and then swung back laterally, as indicated in Fig. 4, thereby leaving the top of plate F exposed, as well as the central circular plate F'''' on the top of spindle A', and which central plate F'''' occupies a position in the circular opening cut in plate F, and is designed to be adjusted so as to stand with its upper surface in the same horizontal plane, or nearly so, as the top surface of plate F. The spring c is designed to allow spindle A' and its plate F' to be depressed simultaneously with the depression of plates F and F''', after the blank to form the head has been fed forward, as above described.

It will be noticed that a circular opening or space, 4, is left between plates F and F''', and through this opening, when said plates are depressed, the cutters work to act upon the blank head-piece B', which may then be held between plates F', F''', and F. After the head has been cut and properly beveled by the cutters attached to cutter-heads d d, shaft G' rocks back, thereby lifting lever G and rods D'', thus elevating plate F', when springs c and f' f' elevate plates F and F''' above the cutters, when another blank head-piece is fed forward, which forces out the already formed head and the waste material left by the cutters, and the operation of the mechanism in cutting and beveling the head proceeds as before explained.

Tubular shaft E is rotated by means of a belt, 5, running from pulley 6 on shaft 7, which has a driving-pulley, 8, upon its outer end. Upon the main shaft 7 are arranged a set of cone-pulleys, 9, from which a belt runs to the cone-pulleys 10 on shaft 11, upon the outer end of which is a spur-gear, 12, which meshes into a spur-gear, 13, fitted to turn upon a stud or journal, 14, fast in the main frame. A wrist-pin, 15, projects from the side of spur-gear 13, upon which one end of a connecting-arm, H, fits, the other end of said arm being fitted to a wrist-pin, 16, in a slot in crank-arm H', fast to the outer end of rocking-shaft G'.

It will thus be seen that when the main shaft 7 is revolved the cutters will be rotated by means of belt 5, and that shaft 11 will also be rotated, thereby communicating a rocking motion to shaft G' through the instrumentality of spur-gears 12 and 13, connecting-arm H, and crank H'.

Having now described how the mechanism is operated which receives and holds the blank-head, and the mechanism which cuts and bevels the head, I will proceed to describe the mechanism which feeds forward the blank for the head at the proper time, as well as the construction and adjustment of the hopper which receives the blank head-piece B. The top or table I of the machine has a narrow slot cut through its entire length, the edges h of said slot being beveled inward and downward to receive the corresponding beveled edges h' h' of the reciprocating tongue-piece I', said tongue-piece having a head-blank feeding-piece, J, fastened to its upper side by means of screws i i, which pass through slots in feed-piece J, the edges of which latter piece rest and slide upon table I, while a plate, k, is fastened to the under side of tongue-piece I', with its edges projecting into grooves l, cut in the edges of pieces k' k', fastened to the under side of table I.

It will thus be seen that tongue-piece I' will be retained in its proper position as it is moved back and forth by means of link-piece K, one end of which is hinged to its outer end, while the other end of said link-piece is hinged to the upper end of arm K', fitted so that it can and does rock on shaft m as rocking-shaft G' rocks back and forth, the two being connected by means of a crank-arm, m', and link n, there being extra holes made in arm K', whereby links n and K can be so adjusted as to give a greater or less forward and back motion to tongue-piece I'. By means of slots in the feed-piece J the latter can be adjusted back and forward independently of the reciprocating tongue-piece I'.

The hopper B'' is made as follows: Between beveled rib-pieces 17 17 on each side of the machine are fitted dovetailed slotted slide-pieces L, and through which slots screws 18 pass to hold said pieces in any desired adjusted position longitudinally upon table I. To the inner ends of slide-pieces L is secured a vertical cross-piece, L', which forms one side of the hopper, the other side of the hopper being formed by the cross-piece L'', its ends being fitted to rise and fall in proper grooves in standards M, connected at their tops by cross-piece M', through which passes the upper ends of crank-screws M'', the upper ends of said crank-screws being connected by a cross-piece, M''', by which arrangement screws M'', which work in the side of hopper B'', can be turned simultaneously to raise and depress pieces L'' to allow any desired thickness of blank head-stock to be fed forward under its lower edge. The ends of hopper B'' are formed by means of adjustable corner-pieces N. These corner-pieces are provided with outwardly-projecting slotted projections 19, through which pass thumb-screws, having thumb-nuts 20, by means of which their heads 21 can be drawn up to hold the corner-pieces N in any desired adjusted position, thereby enabling the operator to adjust said corner-pieces in or out at each end of the hopper, while, by means of set-screws 18, the side L′ of hopper B″ can be moved nearer to or farther from the side L″, whereby hopper B″ can be enlarged or diminished as occasion may require, and still retain its rectangular form.

It will be understood that, in adjusting the machine for use, the feed part J and the motion of tongue-piece I′ must be so arranged and adjusted as that the feed-piece J shall strike and feed forward one of the blank head-pieces B′, and leave it in the proper position on plate F above the cutters, so that when plate F′ is depressed, as before explained, the blank head-piece will be depressed, and clamped securely between the plates F′ and F F‴, and carried down by the motion of lever G to the action of the cutters.

It will be understood that, after a head has been cut and properly beveled, the motion of the machine causes plate F′ to rise to the proper position above the cutters to permit the next blank head fed forward to pass freely and unobstructed between plates F′ and F F‴. If desired or found necessary, small spurs may be inserted in the lower side of plate F or in the upper sides of plates F F‴, to prevent the blank head from turning during the action of the cutters, and, in lieu of spurs, friction surfaces may be employed, such as sand-paper or rubber cloth, to accomplish the same result.

In the use of the word "head," in this specification, it is used in a broad sense, and means, when applied to pails, that part which is usually denominated the "bottom," since the operation of the machine in cutting the material to form the bottom of the pail is the same as when cutting material to form the head of a cask or barrel. It may be here stated that by raising and lowering tubular shaft E, by adjusting-nut a, the cutters can be raised or lowered to cut the edge of the pail-bottom or barrel-head the right thickness for the croze.

Instead of having to remove plate F every time a change is made in the size of a head, it may be fitted with a series of rings made to correspond with the different sizes of heads to be cut, whereby, by taking off or putting on one or more sections, different-sized heads can be cut, and the central plate F‴ may be fitted in the same way, so that by taking off or putting on one or more sections that may be adjusted for cutting different-sized heads without substituting an entire new plate, F‴, every time a change is made in the size of a head. It may here be remarked that spindle A′ is fitted with a spline, which permits it to rise and fall, but prevents it from turning around. If preferred, tubular shaft E may be supported in bearings or boxes in cross-pieces, extending from side to side of the main frame, its lower end resting on a step secured to the lower cross-piece, so arranged that it can be adjusted up and down by set-screws working into the lower cross-piece or lower box, for adjusting said tubular shaft up or down, and the adjustable spindle A′ may pass through and be supported by an elliptical spring upon the upper side of bed-piece B, said spindle being provided with a shoulder or pin to rest upon said spring, and in which case, by means of adjusting-nuts b b′, the said spindle and its plate F‴ can be adjusted to occupy a higher or lower position when the machine is in operation. The tubular stand D would be dispensed with in this modification.

In the use of my machine sections of a head may be cut by simply adjusting the hopper, so that they will be fed accurately over the proper position of the cutter.

Having described my improvements in machines for cutting out bottoms for pails, barrel-heads, and other similar articles, what I claim therein as new and of my invention, and desire to secure by Letters Patent, is—

1. The hopper B″, for holding the blank head-pieces B′, constructed from the parts L′ L″ N N M M, adjusting-arms M″ M‴, and adjusting nuts and bolts 20 and 21, combined together, substantially as and for the purposes set forth.

2. The combination, with tubular stand D and tubular rotating shaft E, of adjustable spindle A′ and plates D′ and F, substantially as and for the purposes set forth.

3. The combination, with the rotating plate D′ and plates F F′ F‴, of the cutter-heads d d, substantially as and for the purposes set forth.

4. The combination, with tubular standard D and rotating tubular shaft E, of adjusting-nut a, substantially as and for the purposes set forth.

5. The combination, with holding-plates F F′ and guide-rods F″, of spiral springs f′, adjusting-hubs 1, and depressing and elevating lever G, substantially as and for the purposes set forth.

6. The combination, with head depressing and holding plate F′ and reciprocating tongue-piece I′, to which feed-piece J is secured, of lever G, arm K′, and the mechanism for connecting said levers to rocking-shaft G′, substantially as and for the purposes set forth.

GEORGE W. PARKER.

Witnesses:
DANIEL D. PARKER,
GEORGE R. CHAFFEE.